United States Patent
Jerding et al.

(10) Patent No.: US 6,804,708 B1
(45) Date of Patent: Oct. 12, 2004

(54) MEDIA-ON-DEMAND FLEXIBLE AND ADAPTIVE ARCHITECTURE

(75) Inventors: Dean F. Jerding, Roswell, GA (US); Arturo A. Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 666 days.

(21) Appl. No.: 09/693,789

(22) Filed: Oct. 20, 2000

Related U.S. Application Data
(60) Provisional application No. 60/214,987, filed on Jun. 29, 2000.

(51) Int. Cl.[7] .................. G06F 15/16; G06F 15/177
(52) U.S. Cl. .................. 709/220; 709/219; 345/744; 725/110
(58) Field of Search .................. 725/110; 709/220, 709/219, 229; 345/744

(56) References Cited

U.S. PATENT DOCUMENTS

| | | | |
|---|---|---|---|
| 4,706,121 A | 11/1987 | Young | |
| 4,751,578 A | 6/1988 | Reiter et al. | |
| 4,885,775 A | 12/1989 | Lucas | |
| 4,908,713 A | 3/1990 | Levine | |
| 4,963,994 A | 10/1990 | Levine | |
| 4,991,011 A | 2/1991 | Johnson et al. | |
| 5,038,211 A | 8/1991 | Hallenbeck | |
| 5,253,066 A | 10/1993 | Vogel | |
| 5,293,357 A | 3/1994 | Hallenbeck | |
| 5,477,262 A | 12/1995 | Banker et al. | |
| 5,479,268 A | 12/1995 | Young et al. | |
| 5,508,815 A | 4/1996 | Levine | |
| 5,568,272 A | 10/1996 | Levine | |
| 5,809,204 A | 9/1998 | Young et al. | |
| 5,815,194 A | 9/1998 | Ueda | |
| 5,818,935 A * | 10/1998 | Maa | 380/200 |
| 5,915,068 A | 6/1999 | Levine | |
| 5,929,850 A * | 7/1999 | Broadwin et al. | 725/110 |
| 6,012,098 A * | 1/2000 | Bayeh et al. | 709/246 |
| 6,025,837 A * | 2/2000 | Matthews et al. | 345/721 |
| 6,067,107 A | 5/2000 | Travaille et al. | |
| 6,161,133 A * | 12/2000 | Kikinis | 709/220 |
| 6,195,692 B1 * | 2/2001 | Hsu | 725/110 |
| 6,295,057 B1 * | 9/2001 | Rosin et al. | 345/744 |

* cited by examiner

*Primary Examiner*—Frantz B. Jean

(57) ABSTRACT

The invention is a flexible and adaptive application framework and method for providing media services via an interactive media services client device coupled to a programmable media services server device. A method of the preferred embodiment of the invention includes distributing or partitioning computation, data storage, and/or data transmission between the server and client devices to flexibly adapt to and take advantage of the available computing and/or network resources.

40 Claims, 7 Drawing Sheets

MEDIA-ON-DEMAND FLEXIBLE AND ADAPTIVE ARCHITECTURE

CROSS-REFERENCE TO RELATED APPLICATION

This application claims the benefit of U.S. Provisional Application No. 60/214,987, filed on Jun. 29, 2000, which is entirely incorporated herein by reference.

FIELD OF THE INVENTION

This invention relates in general to television systems, and more particularly, to the field of media-on-demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

There are two complementary phenomena occurring in cable and satellite networks: increasing DHCT performance and increasing network bandwidth. DHCTs with more memory, faster CPUs, etc. are more capable of performing application tasks than their predecessors. Hence, more "powerful" applications can execute on the DHCT client. Second, the latest network technologies enable more bandwidth and throughput of data from the server to the client—effectively allowing more of the application computation and data storage to take place on the server. Thus, there currently exist cable and satellite television networks with older, more resource constrained HCTs and newer, more powerful DHCTs. Additionally, these HCTs exist in networks with differing bandwidth capabilities.

A headend unit comprising one or more servers receives media and data from service providers via a plurality of network interfaces such as satellite, terrestial, telephone, and the internet. A headend unit server process receives media and data and then transmits media and data to one or more DHCTs. Since there are various types of DHCTs with differing computing and communication capacities, the server process must convert and output media and data that is limited by the computing and communication capacities of the less-capable DHCTs in the network.

If a network is to contain a mixture of HCTs with different performance capabilities, one of the following must typically be true: 1) the more "powerful" applications are only available to the set of customers with the higher performing DHCTs, 2) multiple versions of the application software, each with different features and functionality, must be provided for each different HCT, or 3) the software and data that is provided to the DHCTs is limited in capability to that of the least common denominator—so that all of the authorized DHCTs are capable of executing the provided software and storing the provided data effectively and efficiently. Each of these has unattractive results for the system operator: unhappy customers, wasted network bandwidth, complex management systems, or wasted DHCT capability and lost revenue. Therefore, there exists a need to take better advantage of DHCTs' computing resources via a more flexible application software architecture that supports and adapts to HCT resource and performance capabilities.

Additionally, as the network bandwidth increases the features and functionality of application software can increase by taking advantage of computation and storage that can be done on the server in the headend. However, networks with different bandwidth and throughput capabilities exist such that an application software vendor might have to develop, distribute, and maintain different versions of the application to execute on the different networks. Thus, there exists a need for an application framework that can adapt to different network capabilities, avoiding the need for multiple versions of the application from having to be developed and deployed. And there is a need to support multiple DHCT types concurrently in a network with an architecture that coordinates media and data processing so that more resource capable DHCTs experience less latency in data access from the network by localizing media and data processing within their confines and so that they can also present users with a more comprehensive and rich media and data presentation.

SUMMARY OF THE INVENTION

The invention is a flexible and adaptive application framework and method for providing media services via an interactive media services client device coupled to a programmable media services server device. A method of the preferred embodiment of the invention includes distributing or partitioning computation, data storage, and/or data transmission between the server and client devices to flexibly adapt to and take advantage of the available computing and/or network resources.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
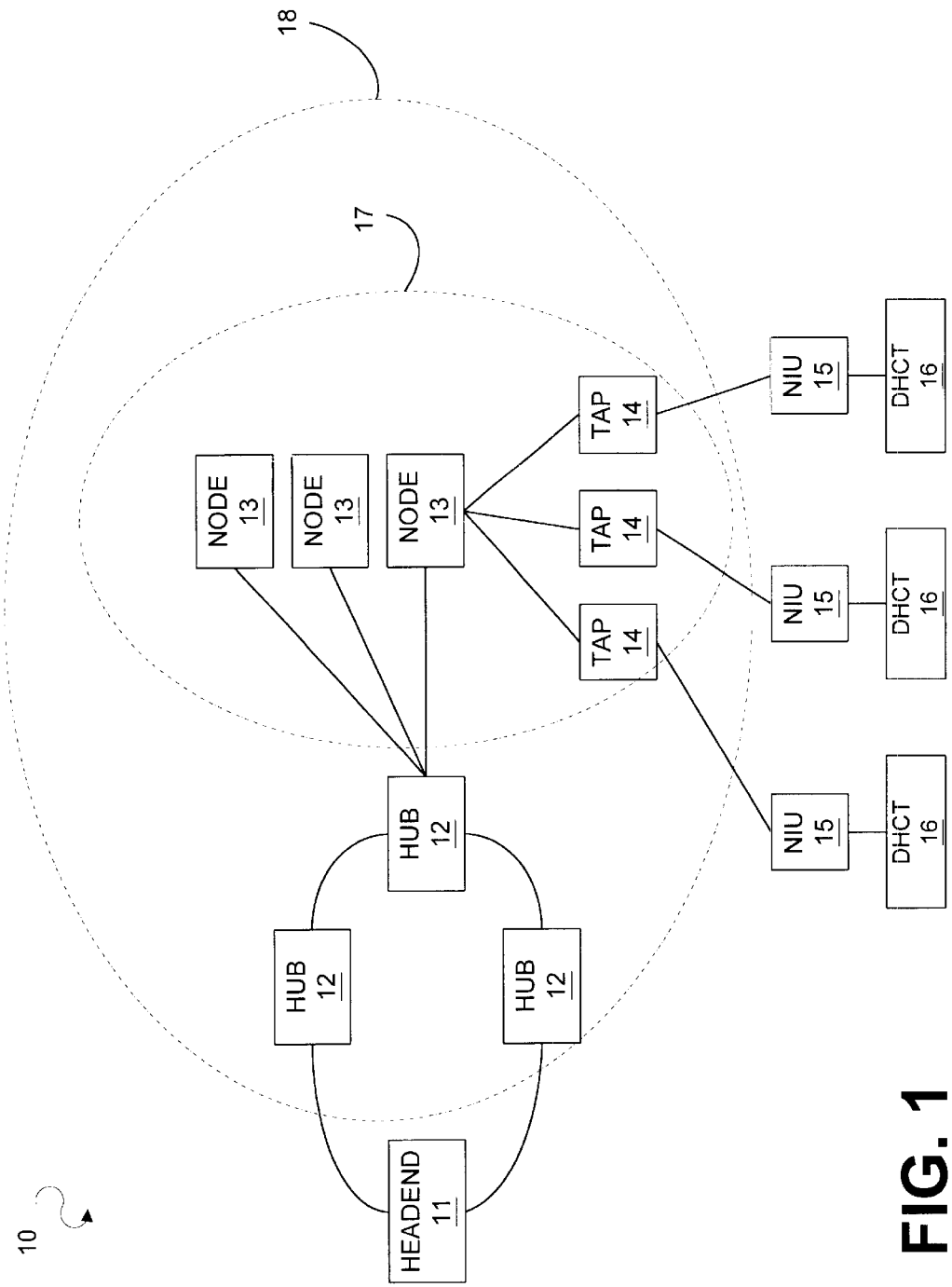
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to cable television subscribers. Although FIG. 1 depicts a high level view of a CTS 10, it should be appreciated that a plurality of cable television systems can tie together a plurality of regional networks into an integrated global network so that cable television subscribers can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as internet connections and Interactive Media Guide (IMG) applications.

The CTS 10 also provides the interfaces, network control, transport control, session control, and servers to access content and services, and distributes content and services to cable television subscribers. As shown in FIG. 1, a typical CTS 10 comprises a headend, hubs, an HFC access network, and subscribers' digital home communication terminals (DHCTs). It should be appreciated that although a single components (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to subscribers downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is a normally located on the side subscriber's premises and provides a transparent interface between the HFC node 13 and the subscribers' internal wiring. Coaxial cables are typically used to couple nodes 13, taps 14 and NIUs 15 because the electrical signals can be easily repeated with radio frequency (RF) amplifiers.

As the high-level operation of CTSs is well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
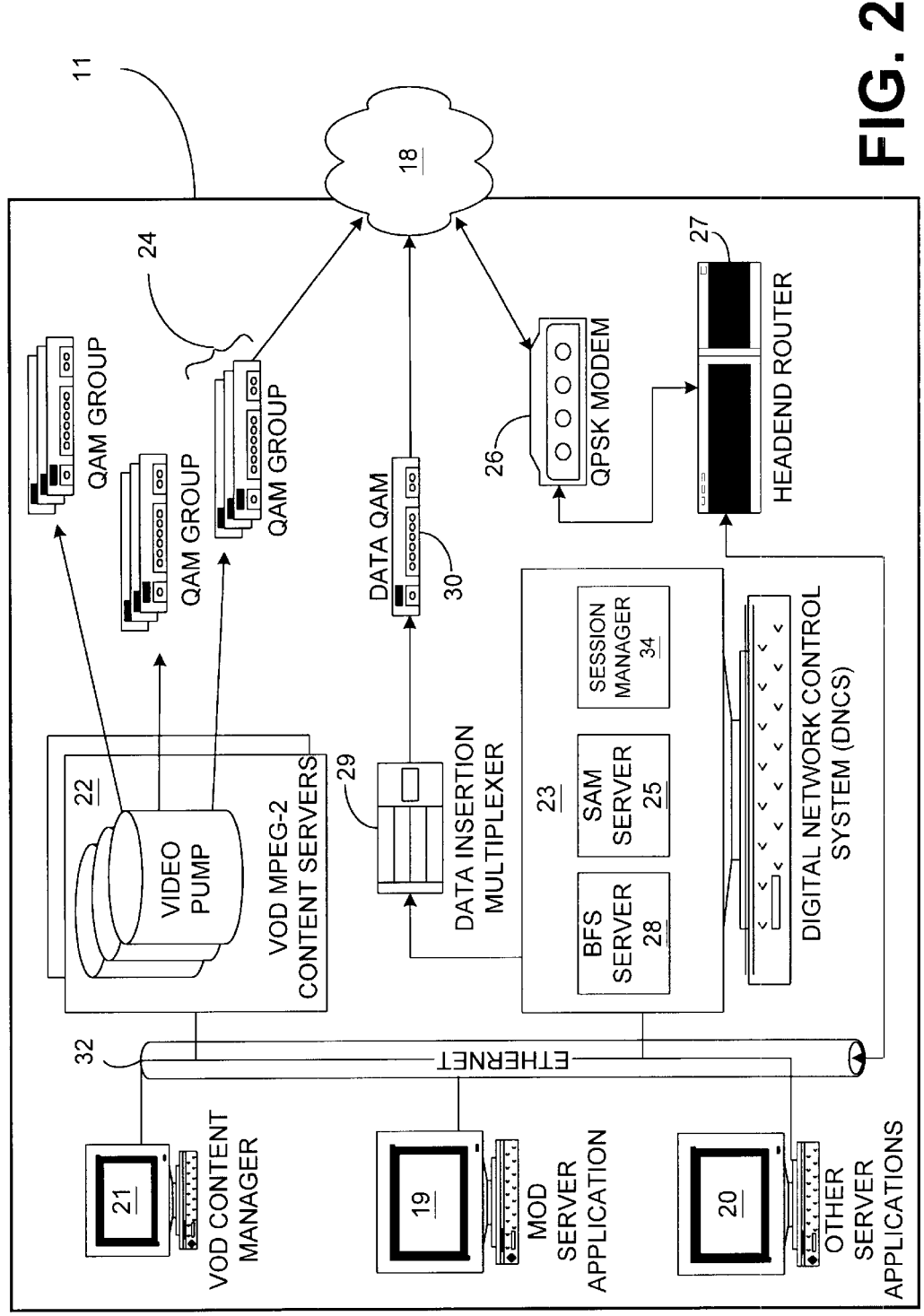
FIG. 2 is a block diagram of the headend shown in FIG. 1.

FIG. 2 is a block diagram of portions of a cable system that includes a media-on-demand application that provides media-on-demand (MOD) services in flexible and adaptive framework in accordance with one embodiment of the present invention. While the preferred embodiment of this invention describes a media-on-demand application, the principles, architecture, and method of this invention can be applied to applications that provide other services. The MOD application's services allow subscribers to browse, access, and if applicable purchase different media content such as video-on-demand (VOD) and audio-on-demand. In the system headend 11, the MOD application server 19 and a plurality of other application servers 20 are connected to a digital network control system (DNCS) 23 via an Ethernet connection 32. The MOD application server 19 is responsible for the following: reserving and configuring system resources needed to provide MOD services, for packaging, configuring and making available to the system the MOD application client executables 63 (FIG. 3), for providing configuration and service data, such as a catalog of titles available for rent, to MOD application clients 63, and for storing data at the request of an MOD application client 63. Each MOD application client 63 executing on an HCT includes a user interface giving the subscriber the capability to browse, purchase, and access media content such as movies, CDs, video clips, etc. This may require, among other things, engaging, preferably, in a direct two-way IP (Internet Protocol) connection with VOD content servers 22.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
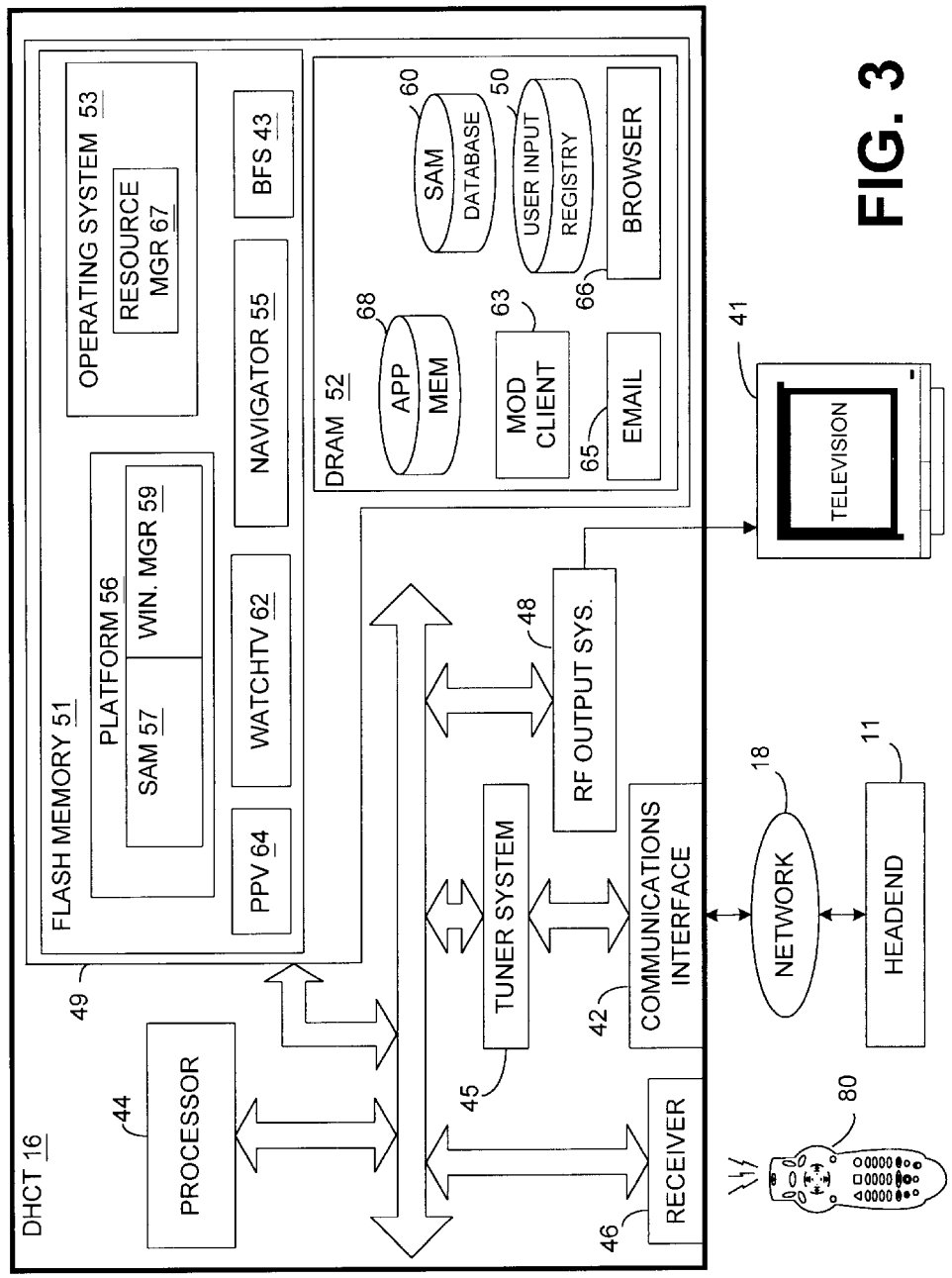
FIG. 3 is a block diagram of the DHCT shown in FIG. 1.

FIG. 3 is a block diagram illustrating a DHCT 16 that is coupled to a headend 11 and to a television 41. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 70 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager client (SAM) 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and can be transferred into DRAM 52 for execution. Likewise, data input for an executable program can reside in flash memory 51 or a storage device and can be transferred into DRAM 52 for use by an executable program or algorithm. In addition, data outputted by an executable program can be written into DRAM 52 by an executable program or algorithm and can be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
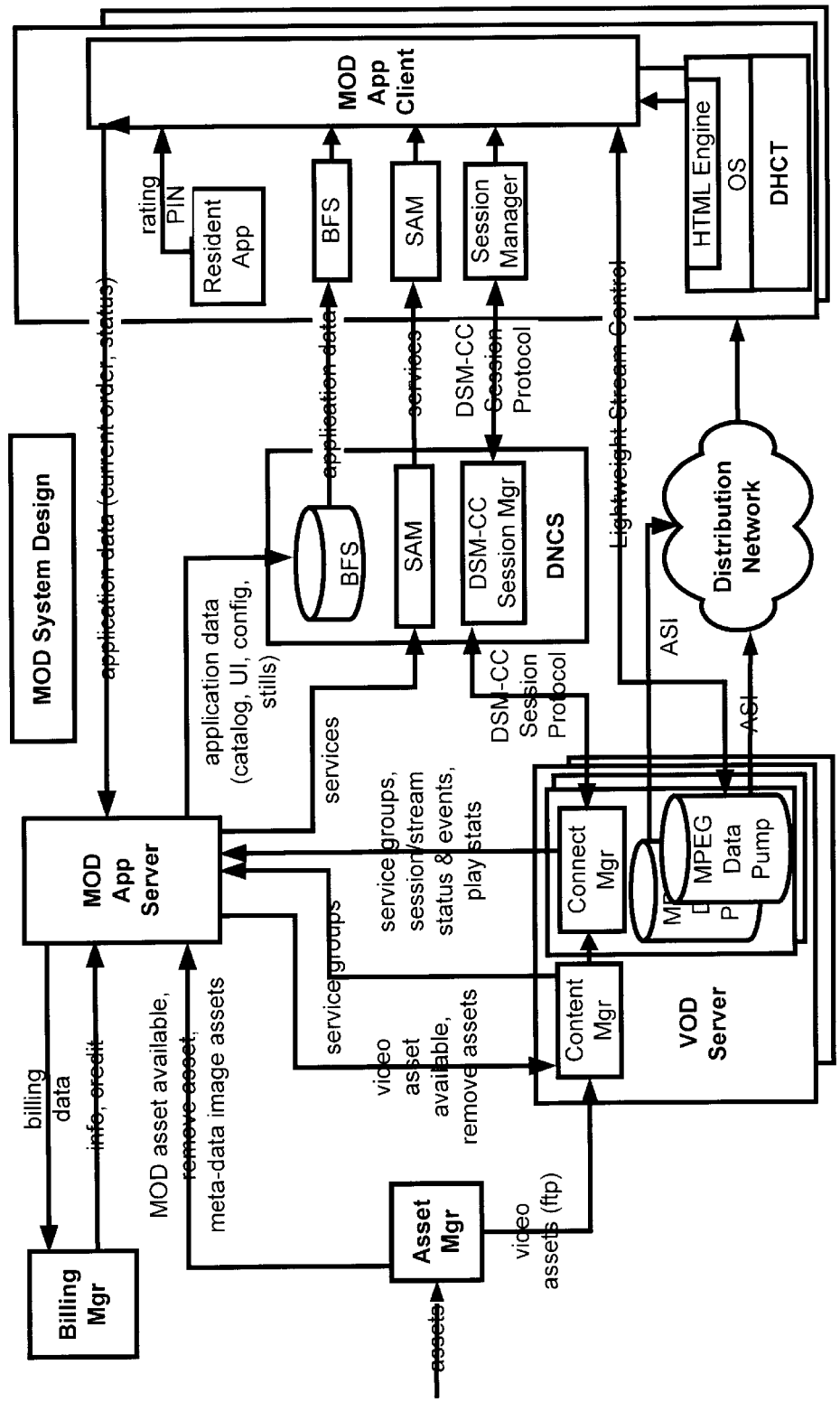
FIG. 4 is a diagram of media-on-demand system interaction.

FIG. 4 is a detailed diagram of the media-on-demand system of the present embodiment. It includes components with which the media-on-demand application server and application client interact, such as the DNCS, BFS, SAM, Billing System, and VOD server. Components in FIG. 4 correspond to similarly named respective components in FIGS. 2 and 3. FIG. 4 also includes a high-level description of the data passed between components. The high-level architecture of the MOD application can be characterized using the 3-tier architecture discussed below. The components that make up the MOD application server and the MOD application client are distributed by the MOD application server depending on the resource capabilities of the network and the DHCT on which the MOD application client executes. This flexible architecture is described in the remainder of this section.

Figure 5:
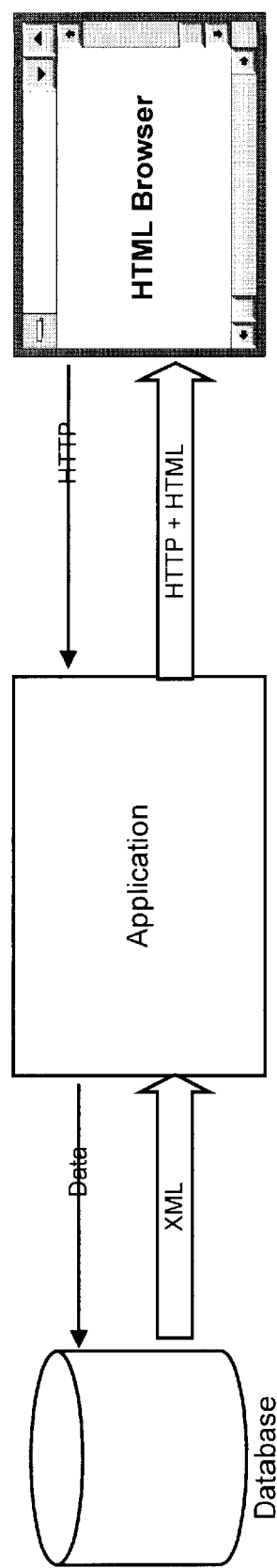
FIG. 5 is a block diagram of the high-level adaptive application framework architecture.

FIG. 5 is a block diagram of the high-level adaptive application framework architecture. This 3-tier architecture includes a database component, an application executable component, and an HTML Web Browser component. The media-on-demand application is designed this way, and other applications that exist on the cable or satellite system can be similarly designed. The flexible and adaptive nature of this preferred embodiment of the present invention are related to how the database and application components can be distributed between the server and client, as discussed next.

Figure 6:
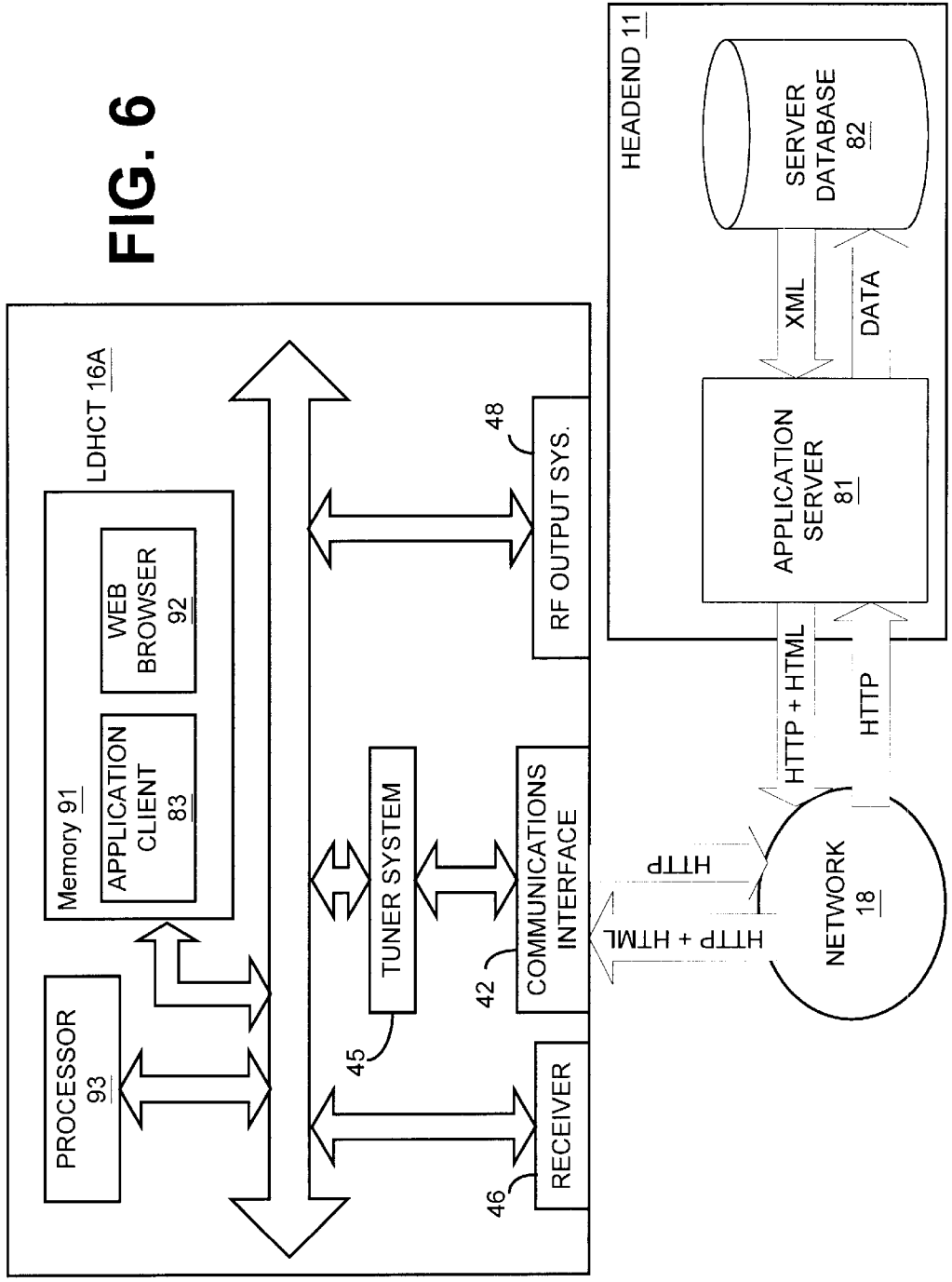
FIG. 6 is a block diagram of a low-capacity DHCT (LDHCT) coupled to the headend depicted in FIG. 2, showing the flexible application framework in a situation where more network resources are available and less computational resources are required on the DHCT.

FIG. 6 depicts a low-capacity DHCT (LDHCT) 16A coupled to a headend 11, showing the flexible application framework in a situation where more network resources are available and less computational resources are required on the DHCT. The LDHCT 16A is similar to the DHCT 16 (FIG. 3) in that both DHCTs preferably comprise a processor 93 or 44, a tuner system 45, a receiver 46, a communications interface 42, memory 91 or 49, and an RF output system 48. The LDHCT 16A, in this embodiment, has fewer applications and less data storage and processing capacity than DHCT 16. The headend 11 includes a flexible and adaptive application server 81 and its server database 82. The application server 81 in the preferred embodiment provides the media-on-demand service previously described. In terms of the flexible and adaptive application framework, however, the application server 81 is responsible for supplying the appropriate components in the form of a downloadable package to each DHCT based on the DHCT performance capabilities. This downloaded package includes at least a web browser, should such a component not already be resident in the DHCT memory. It may also include application components that will form the so-called "application client" and database components that will form the "client database". The former configuration is shown in FIG. 6 and the latter in FIG. 7. In the former case the application server 81 has been configured by the system operator to identify the LDHCT 16A as a low capacity device based on identification information received by the headend 11 from the LDHCT 16A. The identification information may, for example, comprise a model name or number. In the preferred embodiment a user-interface on the application server allows the system operator to specify which DHCT model types or model numbers are to operate in this configuration. Another embodiment includes the capability for the DHCT to provide the application server information about its processing speed, memory, etc.—a resource profile—from which the application server 81 can determine which configuration to use with the DHCT.

The flexible and adaptive nature of the application framework requires that the server database 82 provide its data encoded using a markup language created from the Extensible Markup Language, or XML. In this way the application-specific data is described in the application specific markup language, and the flexible and adaptive information about the DHCT is published in a separate markup language. This language includes a <HIGHCAPACITY> element and a <LOWCAPACITY> element, into which DHCT model elements are grouped. Model elements include <TYPE>, and <MODEL>. The application server 81 then interacts with the DNCS to query the model and type of a specific DHCT given its Media-Access-Controller (MAC) address (an id number). The model and type are compared to those stored in the high profile and low profile groups to determine which components to provide to the DHCT. In addition to the DHCT resource profile information, the server database 82 stores information specific to the application. In the preferred embodiment this application is media-on-demand, and the database stores information such as the movie catalog, current and past purchases, user authorization, user settings, etc.

In the case of the low-capacity DHCT configuration of FIG. 6, the application client 83 component consists only of a small "loader" component. This components only role is to respond to a signal from the DHCT SAM client that the user wishes to access the media-on-demand services. The loader simply activates the web browser 92 with the pre-configured Uniform Resource Locator of the initial content page on the application server 81. Note that in other embodiments where the cable system allows a media-on-demand service to be configured from the headend 11 by the application server 81 to activate the web browser 92 with the appropriate URL, the application client 83 loader component is not necessary and will not be downloaded.

The DHCT user interacts with the media-on-demand service (or whatever service the flexible application is providing) via the web browser 92. The application server 81 responds to Hyper-Text Transfer Protocol (HTTP) requests by processing the requested URL and parameters according to the service it is providing. This may require accessing and/or storing data in the server database 82. In the preferred embodiment, the user-interface for the application is stored as Extensible Style Sheet (XSL) documents that allow the XML media-on-demand information to be translated into HTML using an XSL processor. The server application 81 thus translates the XML data into HTML data and transmits it to the web browser 92 stored in memory 91 at LDHCT 16A which presents the HTML data to a user via a display device such as a computer monitor or a television screen. The information presented to the user may, for example, include information about movies that are available to the user via the DHCT 16A.

Figure 7:
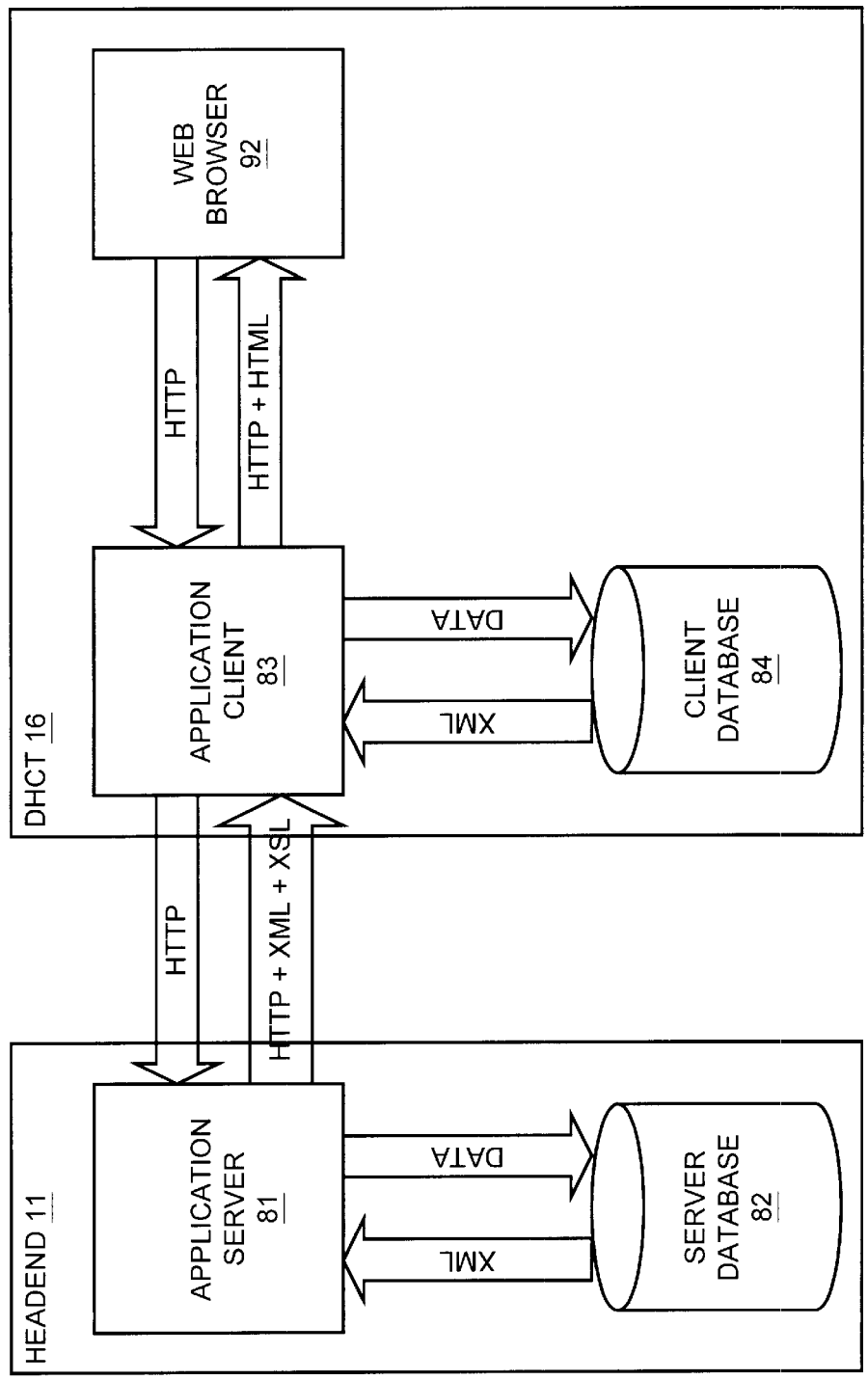
FIG. 7 is a block diagram that illustrates the division of the flexible application framework between the DHCT depicted in FIG. 3 and the headend depicted in FIG. 2, in a situation where less network resources are available and more computational resources on the client are available.

FIG. 7 illustrates the division of the flexible application framework between a client DHCT 16 and a server in the headend 11, in a situation where less network resources are utilized and more computational resources on the client DHCT 16 are available. This configuration is relevant when the network bandwidth available is low and the DHCT includes advanced compute capabilities. The headend 11 includes a flexible and adaptive application server 81 and a server database 82. As discussed previously, the application server 81 identifies the DHCT 16 as a high capacity device based on identification information received by the headend 11 from the DHCT 16. The identification information may, for example, comprise a model name or number. The application server 81 uses the server database 82 for storing various types of data.

In this configuration the application server 81 supplies a downloadable package to the DHCT 16 that includes a web browser 92, should such a component not already be resident in the DHCT memory. It also includes some of the application and database components that in the previous configuration were part of the application server 81. For example, in the preferred embodiment of the media-on-demand application the application includes an XSL processor that as discussed above uses an XSL specification to translate media catalog information received in XML from the server database 82. In the high-capacity DHCT configuration, this XSL processor is downloaded to the DHCT and executes there. Additionally, the HTTP Server component of the application that executes as part of the application server 81 is also downloaded to the DCHT 16. In essence, in this configuration the basic processing aspects of the media-on-demand application execute as the application client 83 on the DHCT rather than as part of the application server 81.

When signaled by the SAM client that the DHCT 16 user wishes to access its services, the application client 83 configures the web browser 92 to use the well-known localhost IP address for its HTTP communication and passes the web browser 92 the URL to the initial content. In this case the web browser 92 sends the HTTP request to the URL via localhost. The HTTP Server executing as part of the application client 83 is listening on the localhost port and receives this request. It then transfers the request to the application specific component (in the preferred embodiment media-on-demand).

In the same way that the application processing is distributed to the client, a cache of the application specific data is also downloaded to the DHCT 16 in the form of a client database 84. This database caches XML and XSL data received from the server database 82 via the application server 81. If the HTTP request requires access or storage of data in the server database 82, the application client 83 sends an HTTP request to the application server 81 for the data. In alternate embodiments where the network does not support HTTP, this request and transmission of the data may be part of a different reverse path and broadcast protocol such as the Broadcast File System (BFS) described previously.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

1. A method implemented by a server coupled to a television set-top terminal via a bi-directional communication network, the method comprising the steps of:

determining that a first television set-top terminal ("STT") has a first characteristic corresponding to a first level of computational resources;

transmitting data having a first format to the first STT responsive to determining that the first STT has the first characteristic, wherein the data having the first format is translated by the first STT to data having a second format that is substantially different from the first format, and wherein the STT is configured to output the data having the second format via a television signal;

determining that a second STT has a second characteristic corresponding to a second level of computational resources that is different from the first level of computational resources; and transmitting data having the second format to the second STT responsive to determining that the second STT has the second characteristic, the second STT being configured to output the data having the second format via a television signal.

2. The method of claim 1, wherein each of the first and second levels of computational resources comprises processing resources.

3. The method of claim 1, wherein less computational resources within the server are required to transmit the data having the first format to the first STT than to transmit the data having the second format to the second STT.

4. The method of claim 1, wherein the first level of computational resources is greater than the second level of computational resources.

5. The method of claim 1, wherein the first STT experiences less latency in accessing the data having the first format than the latency experienced by the second STT accessing the data having the second format.

6. The method of claim 1, wherein the first format comprises XML and the second format comprises HTML.

7. The method of claim 1, wherein the first and second characteristics correspond to respective STT models.

8. The method of claim 1, wherein the first and second characteristics correspond to respective STT identification numbers.

9. The method of claim 1, wherein the first and second characteristics correspond to respective MAC addresses.

10. The method of claim 1, wherein the data having the first format and the data having the second format are encrypted.

11. The method of claim 1, wherein the data having the first format and the data having the second format are encrypted and transmitted over same types of communication channels.

12. The method of claim 11, wherein each of said same types of communication channels is a radio-frequency channel with a specified center frequency.

13. The method of claim 11, wherein data carried in each of said same types of communication channels is modulated via quadrature amplitude modulation (QAM).

14. The method of claim 11, wherein the data having the first format is transmitted over a communication channel with a first specified center frequency and the data having the second format is transmitted over a communication channel with a second specified center frequency.

15. The method of claim 1, wherein the first and second STTs are determined to respectively have the first and second characteristics responsive to respective STT resource profiles provided to the server by the first and second STTs.

16. The method of claim 1, wherein the server translates data having the first format into the data having the second format prior to the step of transmitting the data having the second format to the second STT.

17. A method implemented by a server via a broadcast television network, comprising:

determining that a first television set-top terminal ("STT") has a first characteristic corresponding to a first level of computational resources responsive to a first user activating a first application in the first STT;

transmitting a first software module that executes the first application to the first STT responsive to determining that the first STT has the first characteristic, wherein the first software module is encrypted prior to being transmitted to the first STT;

determining that a second STT has a second characteristic corresponding to a second level of computational resources responsive to a second user activating a second application in the second STT, wherein the second application is configured to perform substantially identical functionality as the first application;

transmitting a second software module that is different from the first software module to the second STT responsive to determining that the second STT has the second characteristic, wherein the second software module is encrypted prior to being transmitted to the second STT;

transmitting data having a first format to the first STT, wherein the data having the first format is provided as input data to the first application; and transmitting data having a second format that is substantially different from the first format to the second STT, wherein the data having the second format is provided as input data to the second application.

18. The method of claim 17, wherein each of the first and second levels of computational resources comprises processing resources.

19. The method of claim 17, wherein the first level of computational resources is greater than the second level of computational resources.

20. The method of claim 17, wherein the first and second characteristics correspond to respective STT models.

21. The method of claim 17, wherein the first and second characteristics correspond to respective STT identification numbers.

22. The method of claim 17, wherein the first and second characteristics correspond to respective MAC addresses.

23. The method of claim 17, wherein the first software module and the second software module are transmitted over same types of communication channels.

24. The method of claim 23, wherein each of said same types of communication channels is a radio-frequency channel with a specified center frequency.

25. The method of claim 23, wherein data carried in each of said same types of communication channels is modulated with quadrature amplitude modulation (QAM).

26. The method of claim 17, wherein the first and second STTs are determined to respectively have the first and second characteristics responsive to respective STT resource profiles provided to the server by the first and second STTs.

27. The method of claim 17, further comprising encrypting the data having a first format and the data having the second format.

28. The method of claim 27, wherein the first STT outputs the input data transmitted in the first format via a television signal, and the second STT outputs the input data transmitted in the second format via a television signal.

29. The method of claim 27, wherein the input data to the first application and the input data to the second application are cyclically transmitted via a broadcast file system.

30. A method comprising the steps of:
determining whether a television set-top terminal ("STT") has a first characteristic corresponding to a first level of computational resources or a second characteristic corresponding to a second level of computational resources that is different from the first level of computational resources;

translating data from a first format to a second format at the STT responsive to determining that the STT has the first characteristic, wherein the second format is substantially different from the first format;

translating the data from the first format to the second format at a server that is coupled to the STT via a bi-directional communication network responsive to determining that the STT has the second characteristic; and outputting the data by the STT via a television signal.

31. The method of claim 30, wherein each of the first and second levels of computational resources comprises processing resources.

32. The method of claim 30, wherein the first level of computational resources is greater than the second level of computational resources.

33. The method of claim 30, wherein the first and second characteristics correspond to respective STT models.

34. The method of claim 30, wherein the first and second characteristics correspond to respective STT identification numbers.

35. The method of claim 30, wherein the first and second characteristics correspond to respective MAC addresses.

36. A server coupled to a television set-top terminal ("STT") via a bi-directional communication network, the server comprising:

memory having program code stored therein; and at least one processor that is programmed by the program code to enable the server to:
determine that a first STT has a first characteristic corresponding to a first level of computational resources;

transmit data having a first format to the first STT responsive to determining that the first STT has the first characteristic, wherein the data having the first format is translated by the first STT to data having a second format that is substantially different from the first format, and wherein the STT is configured to output the data having the second format via a television signal;

determine that a second STT has a second characteristic corresponding to a second level of computational resources that is different from the first level of computational resources; and transmit data having the second format to the second STT responsive to determining that the second STT has the second characteristic, the second STT being configured to output the data having the second format via a television signal.

37. The server of claim 36, wherein each of the first and second levels of computational resources comprises processing resources.

38. The server of claim 36, wherein less computational resources within the server are required to transmit the data having the first format to the first STT than to transmit the data having the second format to the second STT.

39. The server of claim 36, wherein the first level of computational resources is greater than the second level of computational resources.

40. The server of claim 36, wherein the first STT experiences less latency in accessing the data having the first format than the latency experienced by the second STT accessing the data having the second format.

* * * * *